Aug. 17, 1965   E. KESZLER   3,200,501
VERNIER MEASURING DEVICE
Filed Aug. 15, 1962   2 Sheets-Sheet 1
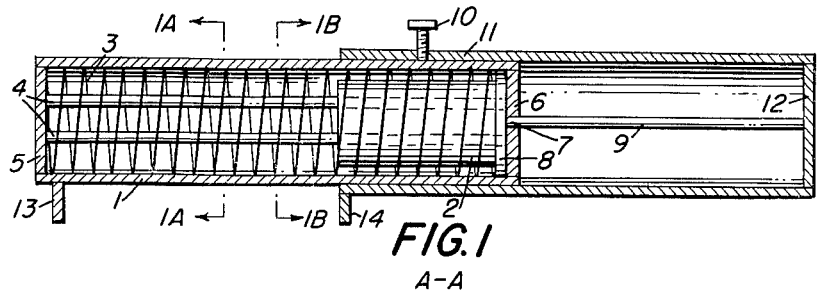
FIG. 1
A-A
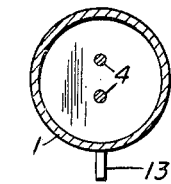
FIG. 1A
FIG. 1B
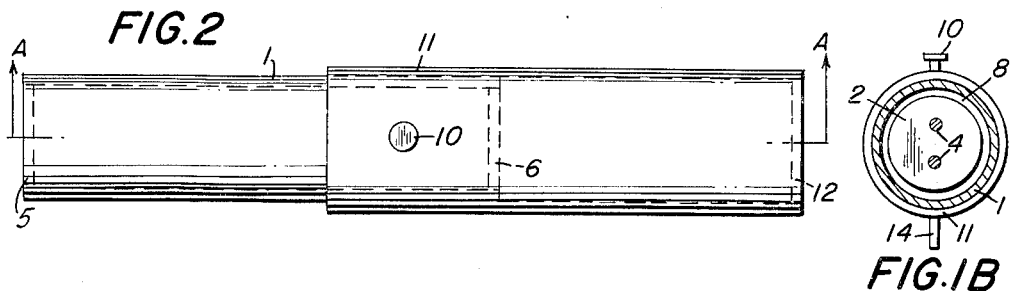
FIG. 2
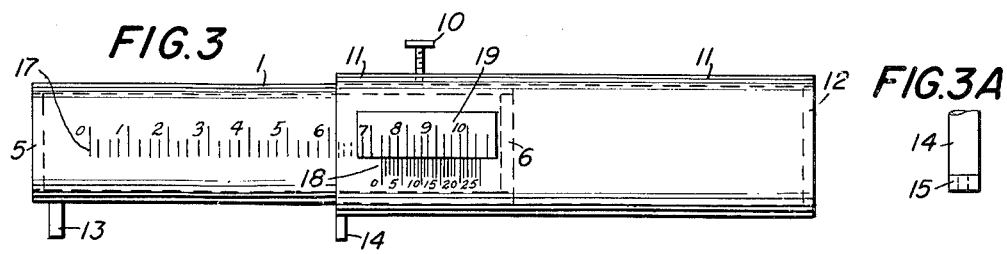
FIG. 3
FIG. 3A
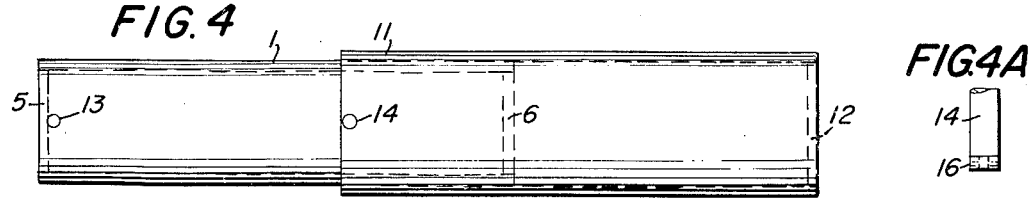
FIG. 4
FIG. 4A
INVENTOR
ERNEST KESZLER
BY Dawson, Tilton, Fallon
Langmuir & Alexander
ATTORNEYS Aug. 17, 1965  E. KESZLER  3,200,501
VERNIER MEASURING DEVICE
Filed Aug. 15, 1962  2 Sheets-Sheet 2

INVENTOR
ERNEST KESZLER
BY Dawson, Tilton, Fallon
Lungmus & Alexander
ATTORNEYS

United States Patent Office
3,200,501
Patented Aug. 17, 1965

3,200,501
VERNIER MEASURING DEVICE
Ernest Keszler, 3520 N. Broadway, Chicago 13, Ill.
Filed Aug. 15, 1962, Ser. No. 217,117
4 Claims. (Cl. 33—143)

This invention relates to a vernier measuring device, and, more particularly, to an improvement on my Patent No. 3,041,731, issued July 3, 1962.

In my Patent No. 3,041,731 I have already pointed out that the precision measurement of the size of round, oval and elongated holes can only be taken in such a way that the measuring is to occur on the two oppositely located points of the hole and these points should be so chosen that the imaginary straight line between these two points cuts the center of the hole. When the calipers that were known before the above-mentioned patent are used for the measurement of the size of holes, it is absolutely necessary to take friction into consideration to assure precise and accurate measurement. While searching for the above mentioned measuring points, friction occurs between the edge of the hole and measuring glides of the caliper. Since the surface of the edge of the hole is in mose cases rough or burred, especially if the holes were made by a punch press, the friction varies. Furthermore, it is also known that in order to determine measurements precisely it is important that the pressure effected on the edge of the hole during the measuring process should be uniform at all times. Since the heretofore known vernier calipers cannot mechanically control the above-mentioned factors that influence the precise measurement, the operator has to make up for the inadequacies of the measuring calipers. Consequently, only experienced persons who have the necessary skill and feeling are qualified for the precision measuring of these measurements, but even in that case, the precise determination of measurements can only be done with great waste of time.

The above-mentioned measuring device is designed to eliminate the guesswork and no special skill is required to operate it. The internal measurements of holes and slots varying in sizes and forms can be obtained easily, quickly and accurately with that new measuring device.

The measuring device which is described in the present patent application is based upon technical solutions which were employed in my Patent No. 3,041,731. Nevertheless it will be shown in the following that this new measuring device has acquired substantial new characteristics through a process of evolution, for instance the manufacture of this new measuring device is greatly simplified as compared to that of the other and consequently production costs are greatly reduced.

A further result of this evolution is also that this measuring device can be handled with one hand—within certain measurement limits, for instance the distance between thumb and little finger, generally speaking a measurement length of 2 inches. Consequently the other hand is freed for the holding in place of the article to be measured and therefore articles, whose weight and size permits this, can be measured without the use of a surface plate merely by holding them in one's hand and this represents a great saving in time and therefore cost, especially in the case of mass production items. This new measuring device created as an improvement of my Patent No. 3,041,731 is illustrated in the attached drawings.

FIG. 1 is the inside view of the measuring device for inside measurement in free state at A—A of FIG. 2.

FIG. 1A illustrates the cross section of FIG. 1 at A1—A1.

FIG. 1B illustrates the cross section of FIG. 1 at 1B—1B.

FIG. 2 is the top view of the measuring device for inside measurement in free state.

FIG. 3 is the side view of the measuring device illustrated in FIG. 2.

FIG. 3A is a fragmentary enlarged elevational view of one modified form of glide.

FIG. 4 is the bottom view of the measuring device illustrated in FIG. 2.

FIG. 4A is a fragmentary enlarged elevational view of another modified form of glide.

Figure 10:
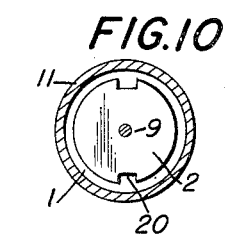
Figure 10A:
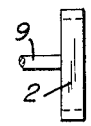
Figure 9:
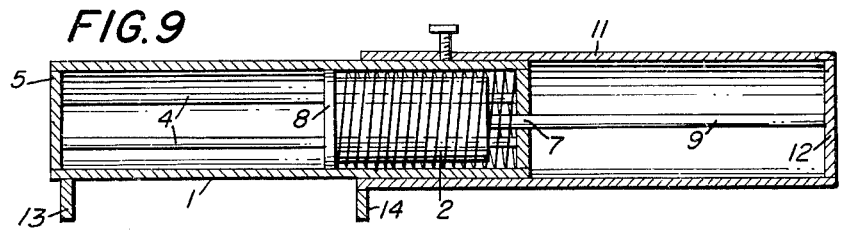
FIG. 9 is the inside view of the measuring device illustrated in FIG. 7, in working position FIG. 10 includes a transverse sectional view and a side view of a variation of slide 2 and guides 4 illustrated in the preceding figures.
Figure 11:
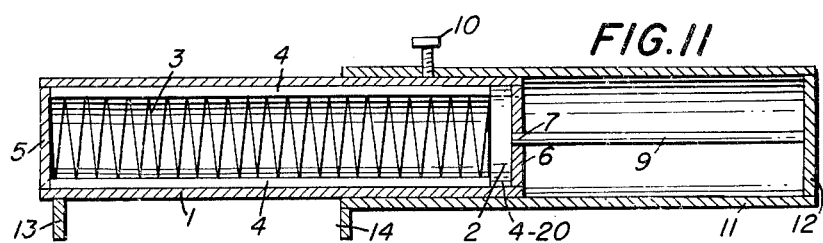
Figure 8:
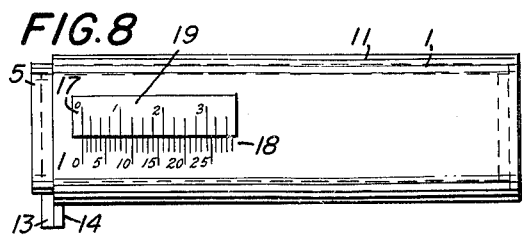
FIG. 8 is the side view of the measuring device illustrated in FIG. 7.

FIG. 11 a variation of FIG. 1 by application of the in FIG. 10 illustrated slide 2 and guides 4.

This device consists of two cylindrical barrels: barrel 1—inside barrel, and barrel 11—outside barrel. Barrel 1 is placed inside barrel 11 and both barrels are movable against each other. Mounted in barrel 1 are slide 2, spring 3 and guides 4. The ends of barrel 1 are closed by endplates 5 and 6, and one end of barrel 11 is closed by endplate 12. Endplate 6 contains opening 7. Slide 2 includes rim 8 and rod 9. The free end of rod 9 is fastened to endplate 12 of barrel 11 through opening 7 of endplate 6. Since rod 9 and endplate 12 are fastened to each other, barrel 1 and barrel 11 are forced to move simultaneously against each other in a longitudinal direction but can not move circumferentially in relation to each other. Spring 3 is located between rim 8 of slide 2 and endplate 5 of barrel 1. Slide 2 is under constant pressure of spring 3 and is movable on guides 4 against spring 3. Guides 4 serve for the guiding of slide 2 and also prevent slide 2 from turning circumferentially inside barrel 1. Slide 2, barrel 1 and barrel 11 can be locked together at any point of the slide-way by a set screw 10. The measuring device has two opposing measuring glides, 13 and 14. Glide 13 is fixed on barrel 1 and glide 14 is fixed on barrel 11. The free ends of measuring glides 13 and 14 serve as measuring points of the measuring device. Each of the measuring points is ground to a radius. The constant pressure of spring 3 on slide 2 forces the measuring points into self alignment in the hole to be measured. It is advisable that this kind of measuring points be used for the measuring of small holes, for instance up to 0.250 inch diameter, but for measuring of bigger holes, to eliminate the friction between the measuring points and the edge of the holes to be measured, it is advisable to furnish the measuring points with a ring 15 or ball bearing 16 each of which is capable of revolving around its own axis. If rings or ball bearings are employed these constitute the measuring points of the measuring device. On barrel 1 is placed a true scale 17, and on barrel 11 is placed vernier scale 18. Barrel 11 contains slot 19 which is associated with vernier scale 18. Vernier scale 18 and slot 19 have to be located in such a manner, that when barrel 1 and barrel 11 are moved against each other, a part of scale 17—in length not less than the length of vernier scale 18—should be visible through slot 19. To vary the distance between the left hand face of the measuring point of measuring glide 13 and the right hand face of the measuring point of measuring glide 14, slide 2 which is connected to barrel 11, has to be pushed against spring 3. The structure of the above-mentioned measuring device can be different from those illustrated and described in the above, without altering the basic solution. For instance FIG. 10 and FIG. 11 illustrate a variation in slide 2 and guide 4: slide 2 is shaped differently and also contains cut-out 20 and guides 4 are shaped in accordance with the cut-outs.

Figure 5:
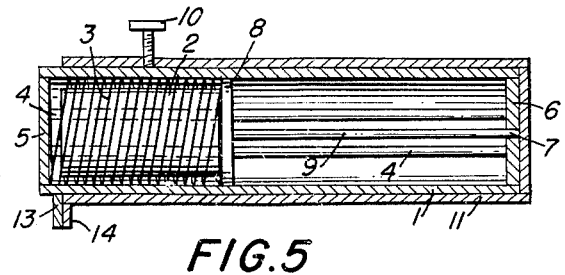
FIG. 5 is the inside view of the measuring device for inside measurement in working position.
Figure 6:
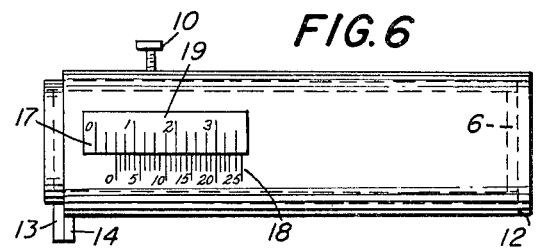
FIG. 6 is the side view of the measuring device illustrated in FIG. 5.
Figure 7:
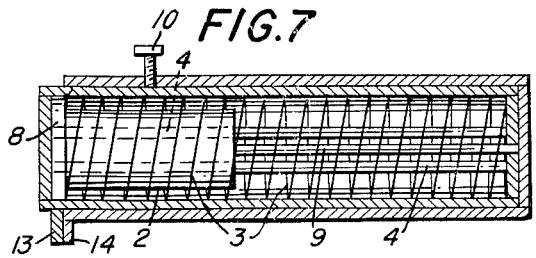
FIG. 7 is the inside view of the measuring device for outside measurement in free state.

The above described device is illustrated in the attached drawings for inside measurement and also for outside measurement; they are identical in principle, but from a manufacturing standpoint the following has to be taken into consideration: For inside measurement the measuring device has to be constructed in such a manner, that in free state the measuring glides 13 and 14 of the device, as a consequence of the contsant pressure of spring 3, should situate themselves at the maximum distance which the length of the device allows (see FIG. 1 and FIG. 11); for outside measurement the measuring device has to be constructed in such a manner, that in free state the measuring glides 13 and 14 of the device, as a consequence of the constant pressure of spring 3, should situate themselves at the minimum distance apart that the device allows (see FIG. 7).

This measuring device operates as follows: When the device is applied to a hole, spring 3 forces the measuring points of the measuring glides 13 and 14 into those two oppositely located points of the hole which are the end points of an imaginary straight line cutting through the center of the hole to be measured. When the measuring points are situated in the hole, the vernier scale 18 becomes simultaneously situated with respect to the true scale 17, and accurately shows the result of the measurement.

I claim:
1. A measuring device, comprising:
   first and second elongated hollow cylinders, with said second cylinder partially telescopically received within said first cylinder,
   said first cylinder having an end closure closing one end thereof, with the second end being open to telescopically receive said second cylinder,
   said second cylinder having the first and second ends thereof closed with an end closure,
   a stem non-rotatatively fixed to said first cylinder end closure and extending axially thereof into said second cylinder, said second cylinder having an aperture in the end closure at a first end thereof receiving said stem,
   a relatively elongated slide non-rotatively fixed to said stem and movably mounted within said second cylinder,
   a spring extending between said slide and one of the second cylinder end closures urging said slide toward the other second cylinder end closure,
   guide means rigidly connecting said second cylinder end closures interiorly of said cylinder, said slide being non-rotatively, slidably mounted on said guide means whereby said cylinders are maintained against relative rotational movement and whereby a constant bearing surface is provided between said slide and guide means irrespective of the degree of telescoping of said cylinders,
   laterally-extending glides secured to the outsides of said cylinders at said first cylinder second end and said second cylinder second end for conjoint action in measuring,
   said first cylinder being equipped with a longitudinally-extending slot for revealing a portion of said second cylinder, said cylinders adjacent said slot and on said portion being equipped with true and vernier scales, and
   set screw means on said first cylinder for maintaining said second cylinder in fixed relation thereto.

2. The structure of claim 1 in which said guide means include a pair of laterally spaced rods in said second cylinder, said slide being equipped with a pair of bores in which said rods are slidably received.

3. The structure of claim 1 in which said spring extends between said slide and said second cylinder second end closure to provide said cylinders normally in minimal telescoping relation with said glides spaced apart for making inside measurements.

4. The structure of claim 1 in which said spring extends between said slide and said second cylinder first end closure to provide said cylinders normally in maximum telescoping relation with said glides in abutting relation for making outside measurements.

References Cited by the Examiner

UNITED STATES PATENTS

| 421,138 | 2/90 | Nylen | 33—147 |
| 1,516,631 | 11/24 | D'Erville | 33—143 |
| 2,523,469 | 9/50 | Hubeck | 33—143 |
| 3,041,731 | 7/62 | Keszler | 33—143 |

FOREIGN PATENTS 738,469  10/32  France.

ISAAC LISANN, *Primary Examiner.*